US009736850B2

(12) United States Patent
Merlin et al.

(10) Patent No.: US 9,736,850 B2
(45) Date of Patent: Aug. 15, 2017

(54) ADAPTIVE RTS/CTS IN HIGH-EFFICIENCY WIRELESS COMMUNICATIONS

(71) Applicant: QUALCOMM Incorporated, San Diego, CA (US)

(72) Inventors: Simone Merlin, Solana Beach, CA (US); George Cherian, San Diego, CA (US); Santosh Paul Abraham, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 135 days.

(21) Appl. No.: 14/456,948

(22) Filed: Aug. 11, 2014

(65) Prior Publication Data
US 2015/0063189 A1    Mar. 5, 2015

Related U.S. Application Data

(60) Provisional application No. 61/871,225, filed on Aug. 28, 2013.

(51) Int. Cl.
*H04W 72/04* (2009.01)
*H04W 72/00* (2009.01)
(Continued)

(52) U.S. Cl.
CPC ..... *H04W 72/0493* (2013.01); *H04W 72/005* (2013.01); *H04W 72/042* (2013.01);
(Continued)

(58) Field of Classification Search
CPC ........... H04W 72/0493; H04W 74/002; H04W 72/042; H04W 72/005; H04W 74/004; H04W 74/006; H04W 28/06; H04L 1/00
See application file for complete search history.

(56) References Cited

U.S. PATENT DOCUMENTS 7,782,822 B2 *  8/2010  Xhafa ............... H04W 74/0808
                                         370/328
2008/0144493 A1 *  6/2008  Yeh ........................ H04W 52/50
                                         370/230
(Continued)

OTHER PUBLICATIONS

Abusubaih M., et al., "Collaborative Setting of RTS/CTS in Multi-rate Multi-BSS IEEE 802.11 wireless LANs", 2008 16th IEEE Workshop on Local and Metropolitan Area Networks, XP055153629, Sep. 1, 2008, pp. 31-36.
(Continued)

*Primary Examiner* — Alex Skripnikov
*Assistant Examiner* — Richard Schnell
(74) *Attorney, Agent, or Firm* — Knobbe, Martens, Olson & Bear, LLP

(57) ABSTRACT

A method, apparatus, and non-transitory computer readable media configured to adaptively enable a request to send/clear to send protocol is disclosed herein. An embodiment may comprise identifying one or more rules including on one or more of a plurality of communication link characteristics of a plurality of communication links between an access point and one or more devices of a plurality of devices. An embodiment may further comprise selectively enabling the request to send/clear to send protocol between the access point and the one or more devices of the plurality of wireless devices based on whether each link characteristic of the one or more rules has satisfied a link characteristics threshold in each rule. In certain embodiments, a station or an access point may identify a rule and transmit the rule to other devices, stipulating one or more conditions which request to send/clear to send is to be used.

38 Claims, 8 Drawing Sheets

(51) Int. Cl.
    *H04W 74/00*    (2009.01)
    *H04W 74/08*    (2009.01)
    *H04L 1/00*     (2006.01)
    *H04W 28/06*    (2009.01)
    *H04W 74/04*    (2009.01)
    *H04W 84/12*    (2009.01)
(52) U.S. Cl.
    CPC ..... *H04W 74/002* (2013.01); *H04W 74/0816* (2013.01); *H04L 1/00* (2013.01); *H04W 28/06* (2013.01); *H04W 74/004* (2013.01); *H04W 74/006* (2013.01); *H04W 84/12* (2013.01)

(56) References Cited

U.S. PATENT DOCUMENTS

| | | | | |
|---|---|---|---|---|
| 2008/0144500 | A1* | 6/2008 | Chen | H04W 74/0816 370/235 |
| 2008/0144586 | A1* | 6/2008 | Kneckt | H04W 74/002 370/337 |
| 2008/0316981 | A1* | 12/2008 | Trainin | H04L 5/1453 370/338 |
| 2010/0014452 | A1 | 1/2010 | Ueba et al. | |
| 2010/0220679 | A1* | 9/2010 | Abraham | H04W 74/06 370/329 |
| 2013/0145224 | A1* | 6/2013 | Kim | H04L 1/0003 714/704 |

OTHER PUBLICATIONS

Chen Y., et al., "An RTS-on-demand Mechanism to Overcome Self-interference in an 802.11 System", Military Communications Conference, 2007, Milcom 2007, IEEE, Piscataway, NJ,USA, XP031232960, Oct. 29, 2007, pp. 1-7.

Mjidi M., et al., "The Impact of Dynamic RTS Threshold Adjustment for IEEE 802.11 MAC Protocol", International Conference on Communication Technology Proceedings, ICCT 2003, XP055153646, Apr. 11, 2003, pp. 1-20, Retrieved from the Internet:URL:http://www.shiratori.riec.tohoku.ac.jp/'deba/Paper/Journal/mis-draft-dec18.pdf[retrieved on Nov. 18, 2014].

International Search Report and Written Opinion—PCT/US2014/050714—ISA/EPO—Nov. 28, 2014.

* cited by examiner

ADAPTIVE RTS/CTS IN HIGH-EFFICIENCY WIRELESS COMMUNICATIONS

CROSS REFERENCE TO RELATED APPLICATIONS

This application claims priority under 35 U.S.C. §119(e) to U.S. Provisional Patent Application No. 61/871,225, filed Aug. 28, 2013, entitled "ADAPTIVE RTS/CTS IN HIGH-EFFICIENCY WIRELESS COMMUNICATIONS," which is hereby incorporated by reference in its entirety.

BACKGROUND

Technological Field

The present application relates generally to wireless communications, and more specifically to systems, methods, and devices for dynamically adapting high-efficiency wireless communications.

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may transmit information to, and/or receive information from each other. The information may comprise packets, which in some aspects may be referred to as data units. The packets may comprise control frames. Control frames having control information and payload data may cause significant overhead and increased processing latency for receiving devices. As such, systems, methods, and non-transitory computer-readable media are needed for adaptation of data or packet transfer protocols and rates in order to reduce network and processing overhead and increase efficiency and reliability.

SUMMARY

Various implementations of systems, methods and devices within the scope of the appended claims each have several aspects, no single one of which is solely responsible for the desirable attributes described herein. Without limiting the scope of the appended claims, some prominent features are described herein. After considering this discussion, and particularly after reading the section entitled "Detailed Description" one will understand how the features of various implementations allow for dynamic adaptation of channel access or transmission parameters based upon an identified channel access parameter.

Systems and methods of dynamically adapting high-efficiency wireless communications techniques through the use of request to send/clear to send (RTS/CTS) protocol are disclosed.

One aspect of the disclosure provides a method for wireless communication. The method may comprise identifying a first rule including one or more of a plurality of communication link characteristics for enabling usage of a request to send/clear to send protocol of a first communication link between an access point and a first device of a plurality of devices. The method may further comprise selectively enabling the request to send/clear to send protocol for communication via the first communication link based on whether each transmission characteristic of the first rule has satisfied a first link characteristic threshold. The method may further comprise identifying a second rule including one or more of the plurality of communication link characteristics for enabling usage of the request to send/clear to send protocol of a second communication link between the access point and a second device of the plurality of devices. The method may further comprise selectively enabling the request to send/clear to send protocol for communication via the second communication link based on whether each link characteristic of the second rule has satisfied a second link characteristic threshold.

Another aspect of the disclosure provides an apparatus for wireless communications. The apparatus may comprise a memory configured to store at least data relating to communication link characteristics. The apparatus may further comprise a processor configured to identify a first rule including one or more of a plurality of communication link characteristics for enabling usage of a request to send/clear to send protocol of a first communication link between an access point and a first device of a plurality of devices. The processor may be further configured to selectively enable the request to send/clear to send protocol for communication via the first communication link based on whether each transmission characteristic of the first rule has satisfied a first link characteristic threshold. The processor may be further configured to identify a second rule including one or more of the plurality of communication link characteristics for enabling usage of the request to send/clear to send protocol of a second communication link between the access point and a second device of the plurality of devices. The processor may be further configured to selectively enable the request to send/clear to send protocol for communication via the second communication link based on whether each link characteristic of the second rule has satisfied a second link characteristic threshold.

Another aspect of the disclosure provides an apparatus operable in a wireless communications system. The apparatus may comprise means for identifying a first rule including one or more of a plurality of communication link characteristics for enabling usage of a request to send/clear to send protocol of a first communication link between an access point and a first device of a plurality of devices. The apparatus may further comprise means for selectively enabling the request to send/clear to send protocol for communication via the first communication link based on whether each transmission characteristic of the first rule has satisfied a first link characteristic threshold. The apparatus may further comprise means for identifying a second rule including one or more of the plurality of communication link characteristics for enabling usage of the request to send/clear to send protocol of a second communication link between the access point and a second device of the plurality of devices. The apparatus may further comprise means for selectively enabling the request to send/clear to send protocol for communication via the second communication link based on whether each link characteristic of the second rule has satisfied a second link characteristic threshold.

Another aspect of the disclosure provides a non-transitory computer readable medium containing instructions that when executed, cause a computer to identify a first rule including one or more of a plurality of communication link characteristics for enabling usage of a request to send/clear to send protocol of a first communication link between an access point and a first device of a plurality of devices. The non-transitory computer readable medium may further cause a computer to selectively enable the request to send/clear to send protocol for communication via the first communication link device based on whether each transmission characteristic of the first rule has satisfied a first link characteristic threshold. The non-transitory computer readable medium may further cause a computer to identify a second rule including one or more of the plurality of communication link characteristics for enabling usage of the request to send/clear to send protocol of a second communication link between the access point and a second device of the plurality of devices. The non-transitory computer readable medium may further cause a computer to selectively enable the request to send/clear to send protocol for communication via the second communication link based on whether each link characteristic of the second rule has satisfied a second link characteristic threshold.

DETAILED DESCRIPTION

Figure 1A:
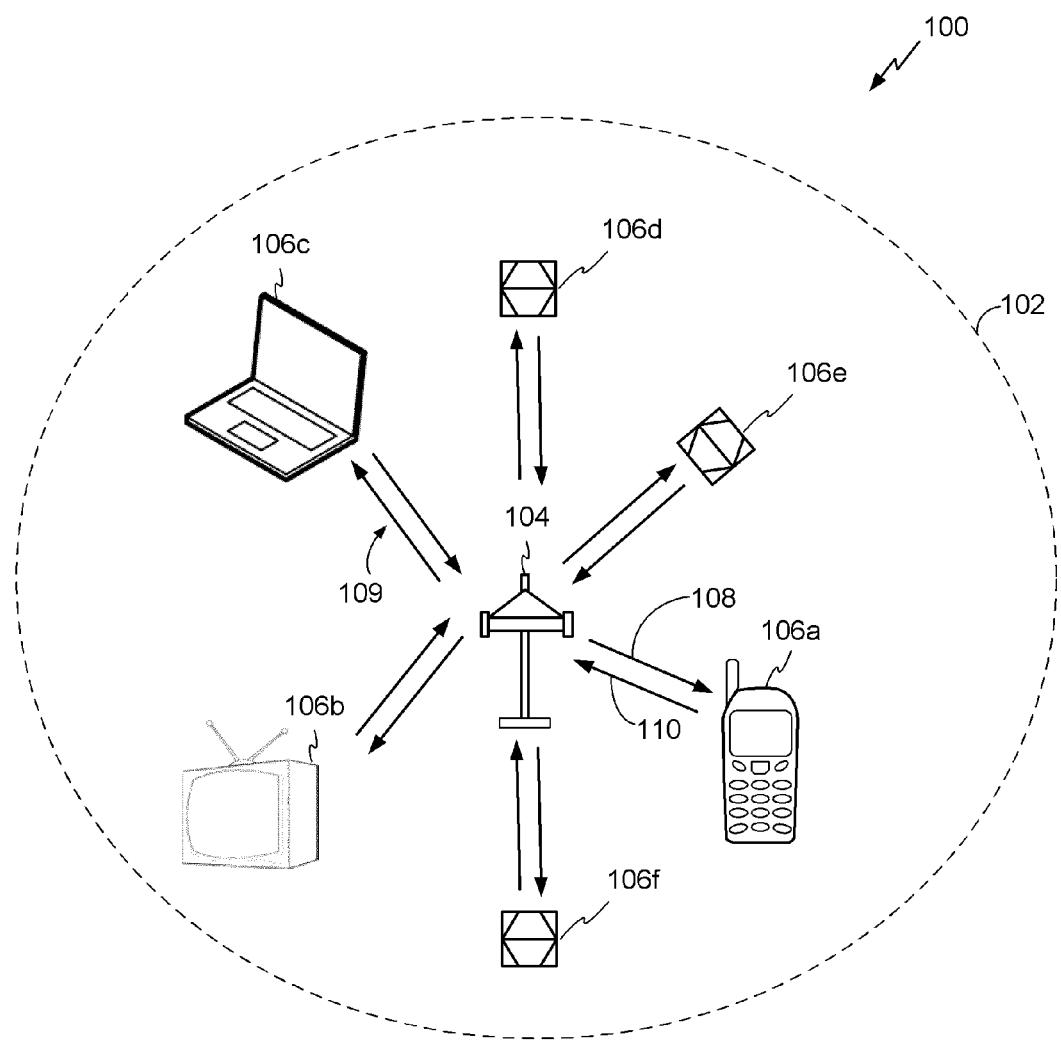
FIG. 1A illustrates an example of a wireless communication system in which aspects of the present disclosure may be employed.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the IEEE 802.11 family of wireless protocols. For example, the various aspects described herein may be used as part of the IEEE 802.11ah protocol, which uses sub-1 GHz bands.

In a wireless network, channel access parameters can be defined to control access to a transmission medium (e.g., a wireless network) by devices communicating via the wireless network. A transmission medium can also be termed as a transmission channel. Examples of channel access parameters can include (but are not limited to) minimum contention window (CWmin), maximum contention window (CWmax), transmit opportunity (TXOP), transmission opportunity limit (TXOP limit), and inter frame space (AIFS). Further examples of channel access parameters can include (but are not limited to) parameters described as part of the enhanced distributed channel access (EDCA) parameters in the 802.11e industry standard. Similarly, transmission parameters can also be defined to dictate how data is sent on a transmission medium or transmission channel once access is granted. Examples of transmission parameters can include (but are not limited to) clear channel assessment (CCA) threshold levels, transmission rates (as defined as a PHY rate or a MAC rate (PHY rate minus overheads)), number of bytes, number of packets, size of each packet, type of each packet, transmission power and retransmission limits. In certain embodiments, both channel access parameters and transmission parameters can be collectively referred to as channel parameters. In particular embodiments, channel access parameters and/or transmission parameters (including both adapted channel access or transmission parameters and identified channel access parameters) are tunable and can be arbitrarily set.

In some aspects, wireless signals in a sub-gigahertz band may be transmitted according to the 802.11ah protocol using orthogonal frequency-division multiplexing (OFDM), direct-sequence spread spectrum (DSSS) communications, a combination of OFDM and DSSS communications, or other schemes. Implementations of the 802.11ah protocol may be used for sensors, metering, and smart grid networks. Advantageously, aspects of certain devices implementing the 802.11ah protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and an STA serves as a user of the WLAN. For example, an STA may be a laptop computer, a personal digital assistant (PDA), a mobile phone, etc. In an example, an STA connects to an AP via a WiFi (e.g., IEEE 802.11 protocol such as 802.11ah) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard, for example. Such devices, whether used as an STA or AP or other device, may be used for smart metering or in a smart grid network. Such devices may provide sensor applications or be used in home automation.

The devices may instead or in addition be used in a healthcare context, for example for personal healthcare. They may also be used for surveillance, to enable extended-range Internet connectivity (e.g. for use with hotspots), or to implement machine-to-machine communications. Wireless nodes or devices, such as stations and APs, may interact in a Carrier Sense Multiple Access (CSMA) type network, such as a network that conforms to the 802.11ah standard. CSMA is a probabilistic Media Access Control (MAC) protocol. "Carrier Sense" describes the fact that a wireless device attempting to transmit on a channel may use feedback from its receiver to detect a carrier wave before trying to send its own transmission. "Multiple Access" describes the fact that multiple wireless devices may send and receive on a shared channel. Accordingly, in a CSMA type network, a transmitting wireless device senses the channel and if the channel is busy (i.e. another wireless device is transmitting on the channel), the transmitting wireless device will defer its transmission to a later time. If, however, the channel is sensed as free, then the transmitting wireless device may transmit its data on the channel.

Clear Channel Assessment (CCA) is used to determine the state of the channel before a wireless device attempts to transmit thereon. The CCA procedure is executed while a wireless device's receiver is turned on and the wireless device is not currently transmitting a data unit such as a packet. A wireless device may sense whether the channel is clear by, for example, detecting the start of a packet by detecting the packet's PHY preamble. This method may detect relatively weaker signals. Accordingly, there is a low detection threshold with this method. An alternative method is to detect some energy on the air, which may be referred to as energy detection (ED). This method is relatively more difficult than detecting the start of a packet and may only detect relatively stronger signals. As such, there is higher detection threshold with this method. In general, detection of another transmission on the channel is a function of the received power of the transmission, where the received power is the transmitted power minus the path loss.

Other CSMA transmission architectures may be employed as disclosed herein. RTS/CTS is one such protocol discussed below that relies on conditions established by the station (STA). RTS/CTS is an optional mechanism or protocol used in a CSMA environment, such as 802.11ah, to reduce data collisions. Often data collisions are the result of a "hidden" wireless device, referred to as a "hidden node." A hidden node or wireless device in this context refers to a wireless device that is out of range of the transmitting wireless device, but in range of the receiver. The "request" and "clear" messages alleviate much of the hidden node problem.

In particular, in a CSMA environment, RTS/CTS also functions as a method for virtual carrier sensing as is implemented in CSMA/CA (Carrier Sense Multiple Access with Collision Avoidance). A wireless device that intends to send data initiates a RTS frame to one (unicast) or more (multicast, broadcast) wireless devices indicating the intent to transmit data. The receiving device (or devices) replies with a CTS frame, indicating that it is ready to receive the transmission. The RTS/CTS frames also include information regarding a time period in which any other wireless devices receiving the frames should not attempt to access the medium.

In certain embodiments, RTS/CTS is implemented under circumstances dictated by a threshold. An exemplary threshold may indicate a minimum packet size before the RTS/CTS protocol is implemented. In certain embodiments the STA implements the RTS/CTS protocol when packets exceed such a threshold. Such a threshold may be defined solely by a STA. In such an embodiment, an AP has no ability to implement or influence the use of the RTS/CTS protocol. As discussed herein, greater efficiencies may be realized and data collisions reduced in an architecture allowing more flexible implementation of RTS/CTS. For instance, thresholds or rules for RTS/CTS implementation that are adaptive or set based on wireless link conditions or conditions realized by the STA or the AP may provide greater transmission efficiency and reduce data collisions.

In certain embodiments discussed herein, an access point may communicate to wirelessly connected stations, a rule for adapting one or more channel access or transmission parameters, based on an identified link characteristics. Thereafter, the stations can transmit data with one or more adapted channel access or transmission parameters adapted based on an identified link characteristic.

FIG. 1A illustrates an example of a wireless communication system 100 in which aspects of the present disclosure may be employed. The wireless communication system 100 may operate pursuant to a wireless standard, for example the 802.11ah standard. The wireless communication system 100 may include an AP 104, which communicates with six stations, STA 106a-STA 106f. The STA 106a-STA 106f may be referred to collectively as the STAs 106.

During operation, an AP 104 can establish communication with the one or more STAs 106 using a connection routine (e.g., an IEEE 802.11ah compliant connection routine). Once connected to the AP 104, the STAs 106 may each transmit data to the AP 104 based at least in part on the access control data stored at each STA 106. The data can specify how to adapt one or more channel access or transmission parameters based on an identified channel access parameter.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may provide wireless communication coverage in a basic service area (BSA) 102. The AP 104 along with the STAs 106 associated with the AP 104 that use the AP 104 for communication may be referred to as a basic service set (BSS). It should be noted that the wireless communication system 100 may not have a central AP 104, but rather may function as a peer-to-peer network between the STAs 106. Accordingly, while the STA 106 or the AP 104 may be referred to as performing various functions, all of the functions of the AP 104 described herein may alternatively be performed by one or more of the STAs 106. Specifically, in a peer-to-peer (P2P) connection or a neighborhood aware network (NAN), individual STAs 106 may perform the disclosed functions even though an AP 104 is described in a given example below. Accordingly, each of the AP 104 and the STAs 106 may have multiple communication links simultaneously, for example, a first communication link and a second communication link, each having its own characteristics.

The STAs 106 are not limited in type and may include a variety of different STAs. For example, as illustrated in FIG. 1A, STAs 106 can include a cellular phone 106a, a television 106b, a laptop 106c, and a number of sensors 106d-f (e.g. a weather sensor or other sensor capable of communicating using a wireless protocol), to name a few possible examples.

Figure 1B:
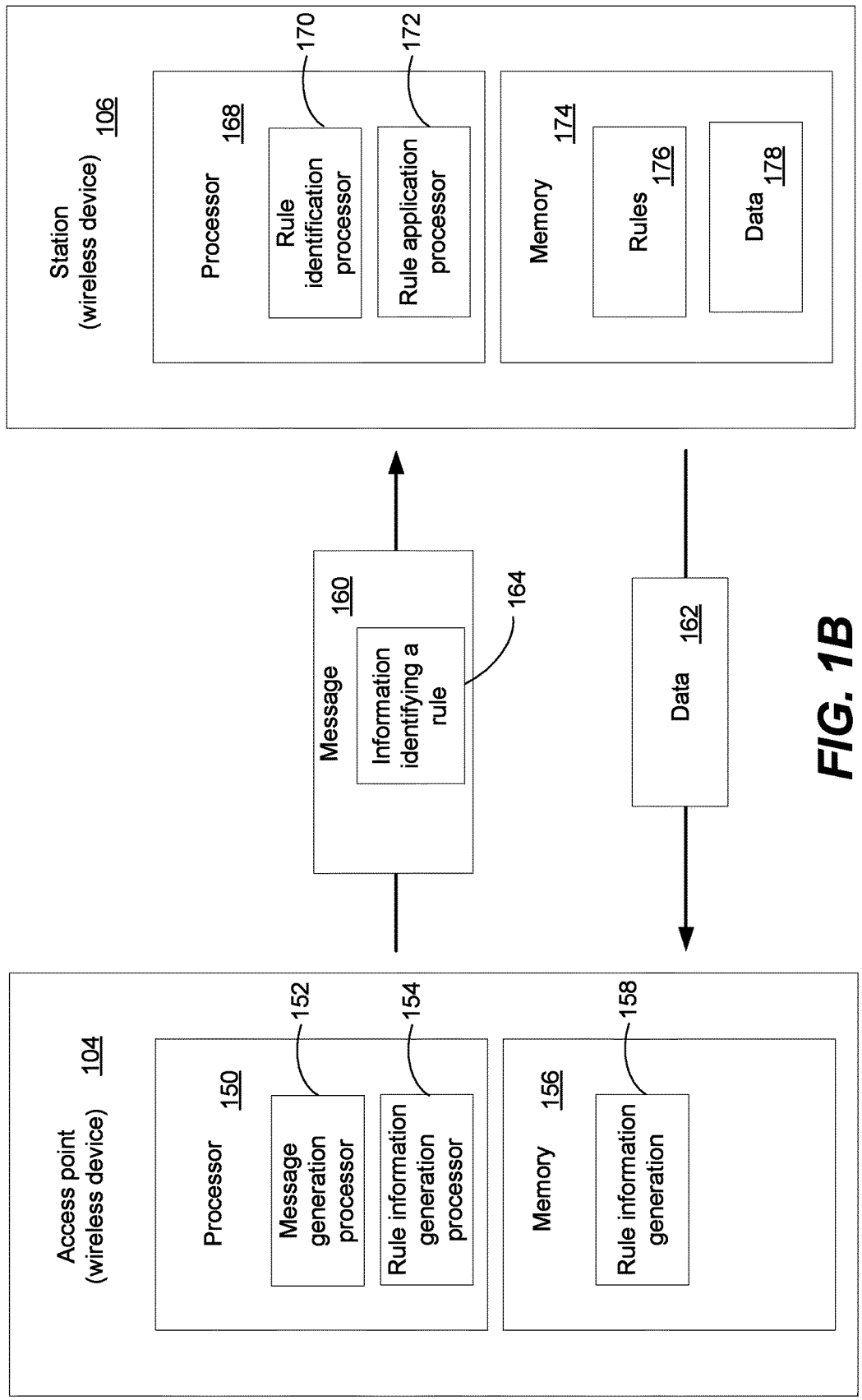
FIG. 1B is a block diagram illustrating various components of the wireless communication system of FIG. 1A in accordance with an embodiment.

FIG. 1B is a block diagram illustrating various components of FIG. 1A in accordance with an embodiment. The block diagram also includes the AP 104 and the STA 106 in communication over a network. The AP 104 comprises a processor 150 and memory 156. The processor 150 can be a general purpose processor with components configured as a message generation processor 152 and a rule information generation processor 154. The message generation processor 152 can be configured to generate a message comprising information identifying a rule for adapting a channel access or transmission parameter based on an identified channel access parameter. This rule may identify a threshold or other rule for implementation of a RTS/CTS protocol. The rule information generation processor 154 can be configured to generate the information identifying a rule included in the message. Each of the message generation processor 152 and the rule information generation processor 154 can access rule information generation data 158 stored in the memory 156 of the access point 104. The rule information generation data 158 can be used by the rule information generation processor 154 to assist in the generation of the information identifying a rule. For example, the rule information generation data 158 can be in the form of a look up table from where a rule corresponding to a quality of service target can be identified using the rule information generation processor 154. The information identifying the rule can then be included in a message generated by the message generation processor 152. The generated message 160 with information comprising a rule 164 can be sent to from the AP 104 to the STA 106.

In certain embodiments, the STA 106 can also comprise a processor 168 and memory 174. The processor 168 can be a general purpose processor with components configured as a rule identification processor 170 and a rule application processor 172. The rule identification processor 170 can be configured to use a message from the AP 104 to identify a rule for adapting a channel access or transmission parameter based on an identified channel access parameter. The rule application processor 172 can be configured to apply the rule by adapting a channel access or transmission parameter based upon an identified channel access parameter. The memory 174 of the STA 106 can include a set of rules and data for transmission to the AP 104. The rule identification processor 170 can identify a rule for adapting a channel access or transmission parameter identified in the message from the rules stored in the memory 174. The rule application processor 172 can apply the identified rule by adapting a channel access or transmission parameter based on an identified channel access parameter in accordance with the identified rule. The data 178 stored in the memory 174 can then be sent as data 162 with the adapted channel access or transmission parameters.

While FIG. 1B depicts the single AP 104 and the single STA 106, as noted with respect to FIG. 1A, multiple wireless devices (e.g., the AP 104 and the STAs 106) may be present, each having multiple connections with other wireless devices. In accordance with the disclosure, each of the different communication links (e.g., a first communication link and a second communication link) may each use the RTS/CTS protocol according to a respective rule. For example, referring briefly back to FIG. 1A, a first communication link (comprising downlink 108 and uplink 110) may have a first rule and a second communication link 109 (between the AP 104 and the STA 106c) may have a second rule. Accordingly, in FIG. 1B, the use of RTS/CTS in each of a first communication link between the AP 104 and the STA 106, for instance, comprising the message 160 and the data 162, may be operate in parallel with a second communication link (not shown for simplicity) according to the second rule. The AP 104 or the STA 106 may participate in more than one active communication link, each having its own rule governing the use of RTS/CTS.

Figure 2A:
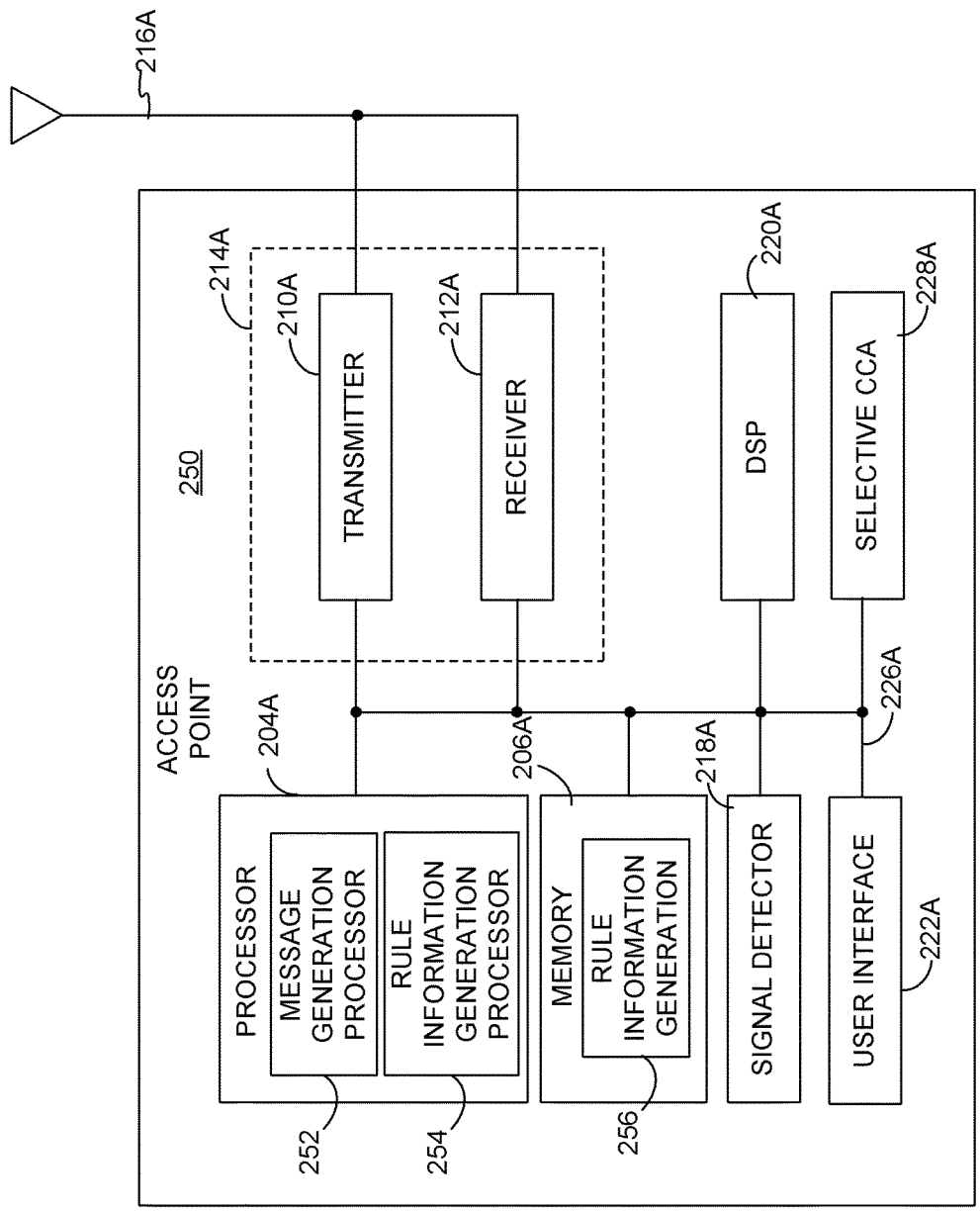
FIG. 2A illustrates various additional components that may be utilized in an access point in accordance with an embodiment.
Figure 2B:
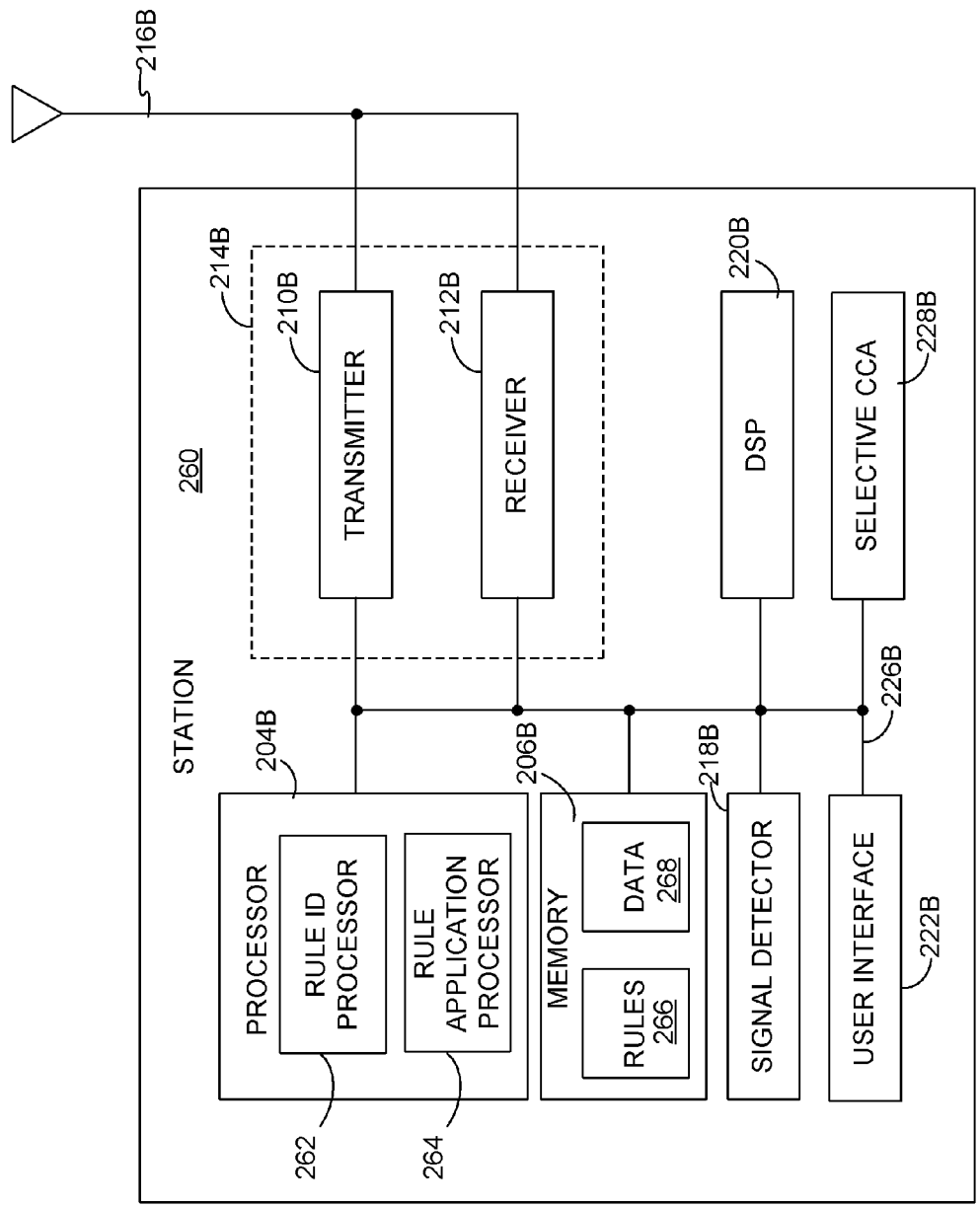
FIG. 2B illustrates various additional components that may be utilized in a station in accordance with an embodiment.

FIG. 2A illustrates various additional components that may be utilized in the AP 104 illustrated in FIG. 1B in accordance with an embodiment. Similarly, FIG. 2B illustrates various additional components that may be utilized in the STA 106 illustrated in FIG. 1B in accordance with an embodiment. For the following discussion, FIG. 2A and FIG. 2B will be discussed in conjunction, with reference to both figures.

The AP 250 or STA 260 may include a processor 204A, 204B which controls operation of its respective AP 250 or STA 260. The processor 204A, 204B may also be referred to as a central processing unit (CPU). As discussed above in FIG. 1B, the processor 204A in an access point 250 can be a general purpose processor with components configured as a message generation processor 252 and a rule information generation processor 254. Similarly, as discussed above in FIG. 1B, the processor 204B in an STA 260 can be a general purpose processor with components configured as a rule identification processor 262 and a rule application processor 264. The processor 204A, 204B may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

Memory 206A, 206B, which may include both read-only memory (ROM) and random access memory (RAM), provides instructions and data to the processor 204A, 204B. A portion of the memory 206A, 206B may also include non-volatile random access memory (NVRAM). The processor 204A, 204B typically performs logical and arithmetic operations based on program instructions stored within the memory 206A, 206B. The instructions in the memory 206A, 206B may be executable to implement the methods described herein. As discussed above in FIG. 1B, the memory 206A, 206B can include rule information generation data 256 when implemented in an AP 250 or rules 266 and data 268 when implemented in an STA 260.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The AP 250 or STA 260 may also include a transmitter 210A, 210B and a receiver 212A, 212B to allow transmission and reception of data between the AP 250 or STA 260 and a remote location. Further, the transmitters 210A, 210B and the receiver 212A, 212B may be configured to allow transmission and reception of setup and/or configuration packets or frames between an AP 250 or STA 260 and a remote location. The transmitter 210A, 210B and receiver 212A, 212B may be combined into a transceiver 214A, 214B. An antenna 216A, 216B may be attached to the housing 208A, 208B and electrically coupled to the transceiver 214A, 214B. Alternatively, or additionally, the AP 250 or STA 260 may include an antenna 216A or an antenna 216B formed as part of the housing 208A or the housing 208B or may be an internal antenna. The AP 250 or STA 260 may also include (not shown) multiple transmitters, multiple receivers, multiple transceivers, and/or multiple antennas.

The AP 250 or STA 260 may also include a signal detector 218A, 218B that may be used in an effort to detect and quantify the level of signals received by the transceiver 214A, 214B. The signal detector 218A, 218B may detect such signals as total energy, energy per subcarrier per symbol, power spectral density and other signals. The AP 250 or STA 260 may also include a digital signal processor (DSP) 220A, 220B for use in processing signals. The DSP 220A, 220B may be configured to generate a data unit for transmission. In some aspects, the data unit may comprise a physical layer data unit (PPDU). In some aspects, the PPDU is referred to as a packet or a frame.

The AP 250 or STA 260 may further comprise a user interface 222A, 222B in some aspects. The user interface 222A, 222B may comprise a keypad, a microphone, a speaker, and/or a display. The user interface 222A, 222B may include any element or component that conveys information to a user of the AP 250 or STA 260 and/or receives input from the user.

The AP 250 or STA 260 may further comprise a selective clear channel assessment (CCA) module 228A, 228B. The selective CCA module 228A, 228B may include any element or component that performs a clear channel assessment for the AP 250 or STA 260 based on one or more parameters. The parameters may include a transmission power, transmission bandwidth, and/or an energy detection threshold.

The various components of the AP 250 or STA 260 may be housed within a housing 208A, 208B. Further, the various components of the AP 250 or STA 260 may be coupled together by a bus system 226A, 226B. The bus system 226A, 226B may include a data bus, for example, as well as a power bus, a control signal bus, and a status signal bus in addition to the data bus. Those of skill in the art will appreciate the components of the AP 250 or STA 260 may be coupled together, or may accept or provide inputs to each other using some other mechanism.

Although a number of separate components are illustrated in FIG. 2A and FIG. 2B, those of skill in the art will recognize that one or more of the components may be combined or commonly implemented. For example, the processor 204A, 204B may be used to implement not only the functionality described above with respect to the processor 204A, 204B, but also to implement the functionality described above with respect to the signal detector 218A, 218B and/or the DSP 220A, 220B. Further, each of the components illustrated in FIGS. 2A and 2B may be implemented using a plurality of separate elements.

In certain embodiments, an AP 104 can identify a rule for adapting one or more channel access or transmission parameters based on an identified channel access parameter or other wireless link conditions. The rule can be in the form of a threshold, formula, a tabular relationship, or a tabular relationship of formulas delineating how to adapting one or more channel access or transmission parameters based on an identified channel access parameter or link condition. The rule may be reflective of conditions under which RTS/CTS is to be implemented. The rule can be sent from the AP 104 to the STAs 106. Alternatively, the rule can be sent from the STAs 106 to the AP 104 or from one STA 106 to another STA 106, as in a direct link or peer-to-peer network.

As discussed with regards to FIGS. 2A and 2B, an AP 250 may include one or more processors and one or more memories. For example, the AP 250 may include a memory storing identifiers of a rule for adapting one or more channel access or transmission parameters based on an identified channel access parameter. The memory can also store instructions executable by the processor(s) to perform various functions for transmitting a message identifying a rule for adapting one or more channel access or transmission parameters based on an identified channel access parameter to an STA 260.

In certain embodiments, when transmitting data, the access AP 104 and STA 106 of FIGS. 2A and 2B may RTS/CTS. RTS/CTS is a protocol that may be implemented by a STA 106 prior to the transmission of data to AP 104. In some embodiments, RTS/CTS may be implemented before the transmission of a MSDU (MAC Layer Service Data Unit) or a PSDU (Physical Layer Service Data Unit) when the data frame size exceeds an established limit, for example, a "dot11RTSThreshold." In 802.11 ah, the dot11RTSThreshold management information base (MIB) object is set to a specific value; the object specifies the maximum length that a MAC protocol data unit (MPDU) frame can have before the 802.11 station uses the 802.11 RTS/CTS protocol. In some embodiments such a threshold may be equivalent to number of octects (e.g., 2347 octects), above which an RTS/CTS protocol may be required by the STA 106 transmitting the data.

A threshold such as the dot11RTSThreshold may be set individually by each STA 106 in a given wireless network. Such architecture provides the STA 106 with the sole discretion as to whether to implement the RTS/CTS protocol during data transfer. Accordingly, under such circumstances, the AP 104 is not capable of controlling RTS/CTS use. Additionally, use of RTS/CTS my not be optimized for wireless link conditions or wireless device (AP 104, STA 106) capabilities and characteristics. This type of system allows an entity other than the STA 106 to dictate the use of RTS/CTS and may lead to more efficient transmissions.

In certain embodiments described herein, an AP 104 or STA 106 may be granted the ability to determine RTS/CTS use during transfer of data via a wireless link. In determining whether to use an RTS/CTS protocol, an AP 104 or STA 106 can identify certain wireless link characteristics or equipment capabilities upon which a rule can be defined, establishing under what conditions RTS/CTS is to be employed in a given wireless link. The message can then be sent to other wireless devices, indicating the conditions under which RTS/CTS is to be implemented. Such a message may be unicast to a single device, or may also be multicast or broadcast, as described herein. Conversely, an AP 104 or STA 106 may further indicate a complete or partial disablement of RTS/CTS, using the methods disclosed herein. In certain embodiments, such a message may include a rule preventing the use of RTS/CTS or halting its use. As with other embodiments, the disablement of RTS/CTS may be dependent on link conditions or characteristics.

Figure 3A:
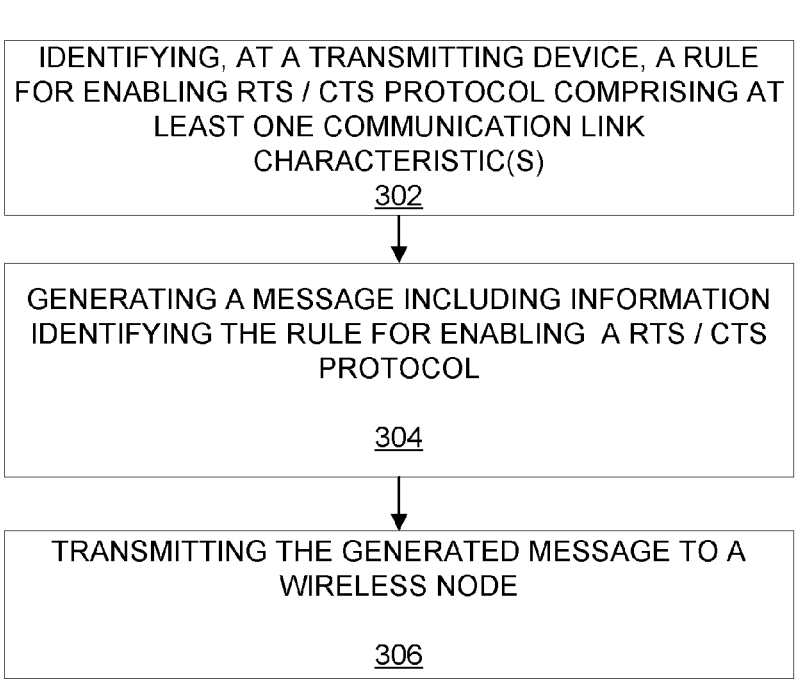
FIG. 3A is a functional block diagram of transmitting device in accordance with an embodiment.

FIG. 3A is a flowchart illustrating a process 300 for generating a message with a rule for RTS/CTS use in a high efficiency wireless environment in accordance with an embodiment. The process 300 can be performed by an AP 104 or STA 106 illustrated in FIG. 1A on one or more wireless communications link. At block 302, the AP 104 may identify a rule comprising the wireless link characteristic or characteristics that will use to selectively enable implementation of RTS/CTS protocol in data transmission. At block 304, a message may be generated by the AP 104 that includes information identifying the rule establishing conditions under which a RTS/CTS protocol should be used by wireless device or devices (e.g., STAs 106) to which the AP 104 is connected. Such conditions may be one or more wireless link characteristics as determined by the transmitter, in this case, the AP 104.

As a non-limiting example, conditions such as the received signal strength indication (RSSI), modulation and coding scheme (MCS), protocol packet data unit (PPDU) duration, bandwidth (BW), packet error rate (PER), transmission (TX) mode, retransmission number, and/or access class may be selected as one or more of the conditions upon which the rule for RTS/CTS use is determined. Each of the above noted characteristics may be used to generate a rule or rules under which the receiving STA 106 is to use RTS/CTS. The rule may incorporate a threshold level above which or below which, depending on the characteristic, the STA 106 will use RTS/CTS for data transmission. As explained below with respect to FIG. 4, FIG. 5, and FIG. 6, the STA 106 receiving the message and associated rule, may measure the associated characteristic or characteristics and determine whether to employ RTS/CTS depending on the satisfaction of the conditions.

Next, at block 306, the generated message is transmitted from the AP 104 to a STA 106. The message may be a specific message generated solely for the purpose of indicating the rule. In certain embodiments, however each of the above exemplary thresholds or reference values may further be sent in other communications from the AP 104 to STA 106. Such communications may be the AP beacon or other management frame. This is noted below with respect to FIG. 4. It is to be appreciated that the message (or rule) may be appended to any practical transmission. The transmission may further be included in a unicast, multicast, or broadcast message. This may serve to enable selective implementation of RTS/CTS on a per-station or per-access point basis.

Figure 3B:
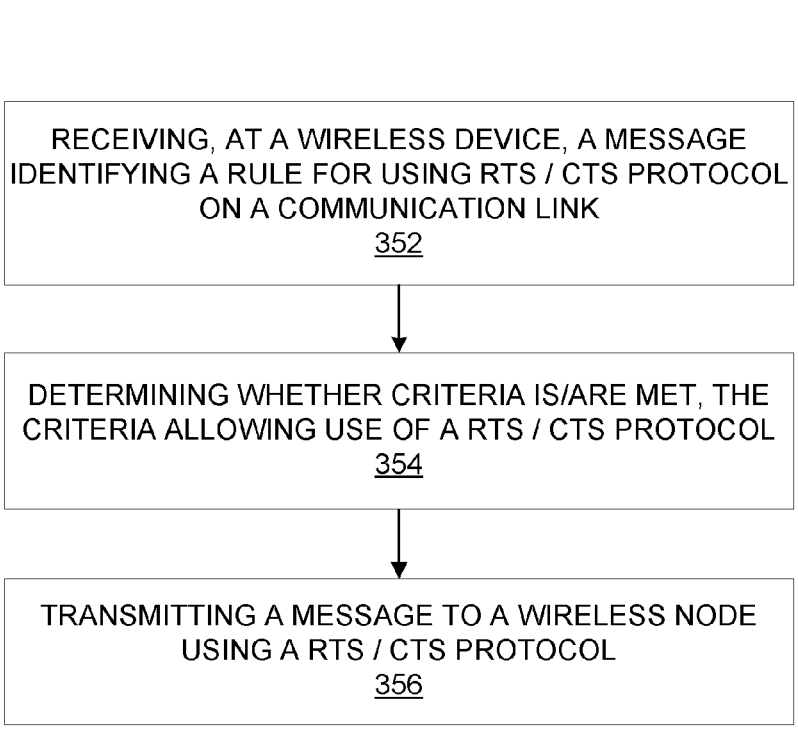
FIG. 3B is a functional block diagram of a wireless device in accordance with an embodiment.

FIG. 3B is a flowchart illustrating a process 350 for receiving and implementing a message with a rule for RTS/CTS use in a high efficiency wireless environment in accordance with an embodiment. At block 352, the message transmitted in block 306 above is received at STA 106. The message may include the rule identifying a rule comprising or otherwise including a condition or conditions based on one or more link characteristics, the rule used to selectively enable the use of RTS/CTS in a wireless communication. Upon receipt of the message comprising the rule or rules, the STA 106 will determine whether the conditions are met at block 354 and may selectively enable RTS/CTS based on the rule. The rule may include a threshold level for one or more of the link characteristics. For instance, a rule may include a threshold RSSI (RSSI_threshold), below which, the STA 106 may be required use a RTS/CTS protocol. That is, when the received signal strength from the AP 104 or another wireless device as received at the STA 106 is below a threshold set by the rule received from the AP 104, the STA 106 will use RTS/CTS to transmit the required data.

While the above descriptions for FIG. 3A and FIG. 3B are directed to an AP 104 and an STA 106, it is to be appreciated that under the methods of present disclosure, either the AP 104 or the STA 106 may perform the functions of the other as related to the figures and discussion herein. Either the AP 104 or the STA 106 may determine the rule or rules for RTS/CTS use as discussed above, as required by the method. Such communications and rules can further occur between two or more STAs 106 in a peer-to-peer or direct link environment. Accordingly, interpretation of this disclosure should not be limited to one-way communications from AP 104 to STA 106. Communications implementing the methods disclosed herein may be AP to STA, STA to AP, or STA to STA as required. Furthermore, as noted above, each of the wireless devices may have multiple, concurrent communication links to which the wireless device may simultaneously enable or disable a rule, based on the rule or rules identified.

Figure 4:
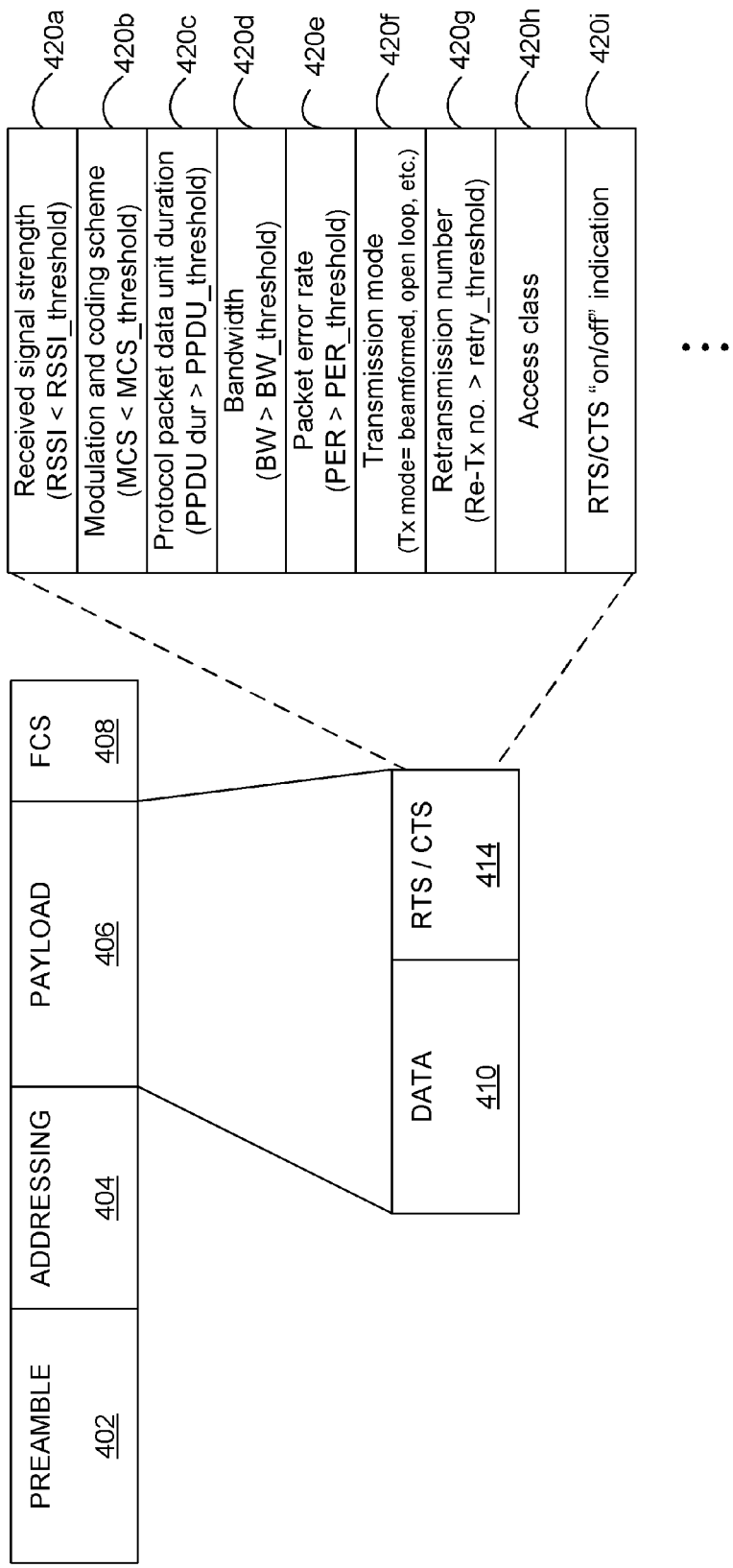
FIG. 4 illustrates an embodiment of a data structure in accordance with an embodiment.

Turning now to FIG. 4, a data structure 400 used to transmit data frames, comprising a rule for using a RTS/CTS protocol in accordance with an embodiment, is shown. Data structure 400 may have multiple frames as shown. As a non-limiting example, data structure 400 may have a preamble 402, address 404, a payload 406, and frame check sequence 406. It is to be appreciated that the example data structure 400 disclosed herein should not be considered limiting as various data structures have more or fewer frames may be employed using the details of the present disclosure.

As shown, the payload 406 may include sub frames including the critical data 410 for a given wireless network function, in addition to an RTS/CTS frame 414. The RTS/CTS frame 414 may include one or more of a plurality of thresholds 420, or thresholds 420a-420h, comprising the "rules" as described with respect to FIG. 3A and FIG. 3B. The RTS/CTS frame 414 may further include comprise an on/off indication 420i for the RTS/CTS protocol. The on/off indication 420i may simply dictate the use of RTS/CTS without relying on conditions or thresholds as described below.

The RSSI threshold 420a (RSSI<RSSI_threshold), as noted above may indicate a minimum received RSSI threshold, below which the receiver of the message (e.g., AP 104 or STA 106), will be required to use RTS/CTS. Generally in wireless transmissions, the longer the distance between transmitter and receiver, the greater the signal attenuation (i.e., lower RSSI at the receiver). Simultaneously, the risk of hidden nodes or devices also increases. Accordingly, a minimum RSSI_threshold value contained in the RSSI condition 420a may serve to increase transmission efficiency and reliability in certain embodiments. In another embodiment, the RSSI condition 420a may also be a maximum RSSI threshold.

The MCS threshold 420b (MCS<MCS_threshold) may also be implemented in the RTS/CTS frame 414, providing a MCS threshold for a given transmission, dictating the use of RTS/CTS. In an embodiment, a rule based on the MCS threshold 420b may serve to increase transmission reliability by using RTS/CTS for transmissions having a lower MCS, e.g., a minimum threshold. Such a threshold indicates the use of RTS/CTS for those transmissions having a lower MCS thus, generally requiring more access to the medium. Alternatively, the MCS threshold 420b may be set as a maximum. In certain embodiments, a lower MCS may provide lower bit rate data and thus a more robust transmission, while a higher MCS may increase the risk of data loss in a high attenuation or high traffic environment due to the higher bit rates. Accordingly, using RTC/CTS for high MCS transmissions may assist proper receipt of data at a given (e.g., a high) MCS. Thus it may be useful in certain embodiments to set a maximum MCS, above which RTS/CTS is used.

In an embodiment, a rule may comprise a PPDU duration threshold 420c (PPDU>PPDU_threshold). Generally, a longer duration data packet has a higher probability of being interrupted by other traffic on the medium, due to the length of time required to transmit longer packets. A PPDU threshold 420 indicating a maximum length PPDU, over which RTS/CTS is used may increase the reliability and efficiency of the transmission of longer packets.

In an embodiment, a rule may comprise a bandwidth threshold 420d (BW>BW_threshold). If a transmission requires a significant amount of bandwidth for a particular transmission, a device may contend for and "reserve" the transmission medium through the use of RTS/CTS, limiting the amount of traffic. Accordingly, the rule using the bandwidth threshold 420d may set a maximum bandwidth threshold, over which members of a wireless cluster use RTS/CTS.

In an embodiment, a rule may include a packet error rate threshold 420e (PER>PER_threshold). RTS/CTS generally allows a wireless device (e.g., AP 104, STA 106) to contend for the medium, serving to reduce frame collisions and data traffic. As the number of transmitting devices increases a packet error rate of certain transmissions may increase due to increased frame collisions from the increased amount of traffic on the medium. Accordingly, the use of a maximum packet error rate 420d threshold, over which RTS/CTS is used may serve to reduce collisions and packet error rate.

In an embodiment, a rule may include a transmission mode threshold 420f. Because some transmission modes are more susceptible to collisions and data loss, a device may select a specific transmission mode. As a non-limiting example a beamformed transmission may generally be less susceptible to traffic, as it is sent directly to a receiver, thus may generally not require the extra reliability afforded by RTS/CTS. The addition of a block check character (BCC), low-density parity-check (LDPC) codes, or analogous measures, may serve a similar purpose, reducing data loss through error recovery methods. Accordingly, rules may be set based on the transmission mode used.

In an embodiment, a retransmission number 420g (retransmission number>retry_threshold) may also be used in setting the rules for RTS/CTS use. As a the number retransmissions (or retries) increases for a given packet due to previous failed attempts, the retransmission number 420g may be included as a threshold over which RTS/CTS is used.

In an embodiment, the access class 420h (AC_set) may further be used as criteria to establish a rule, indicating the use of RTS/CTS for a given access class 420h or classes.

As the AP 104 may identify the thresholds 420 upon which the rule is to be base, the RTS/CTS frame 414 may be populated with information providing the STA 106 with the rule for the use of RTS/CTS protocols. In such an embodiment, a sub frame may include information identifying it as a RTS/CTS frame 414 further including one of more of the thresholds 420 or reference values as described above. The use of RTS/CTS then is dependent on and the receiving device's measurement of link conditions and the relationship with any thresholds associated with the rule contained within sub frame 414. The frame may alternatively include an appropriate, unconditional 1-bit or 0-bit, indicating the use of RTS/CTS for the given wireless device (AP 104 or STA 106, for example). As such, the on/off indication may further be conditional on the thresholds as described herein or may be unconditional, only depending on the requirements of the transmitting device. It is to be appreciated that the rule may be transmitted in a beacon, a management frame, or appended to or included in any practical location within a data packet.

Figure 5:
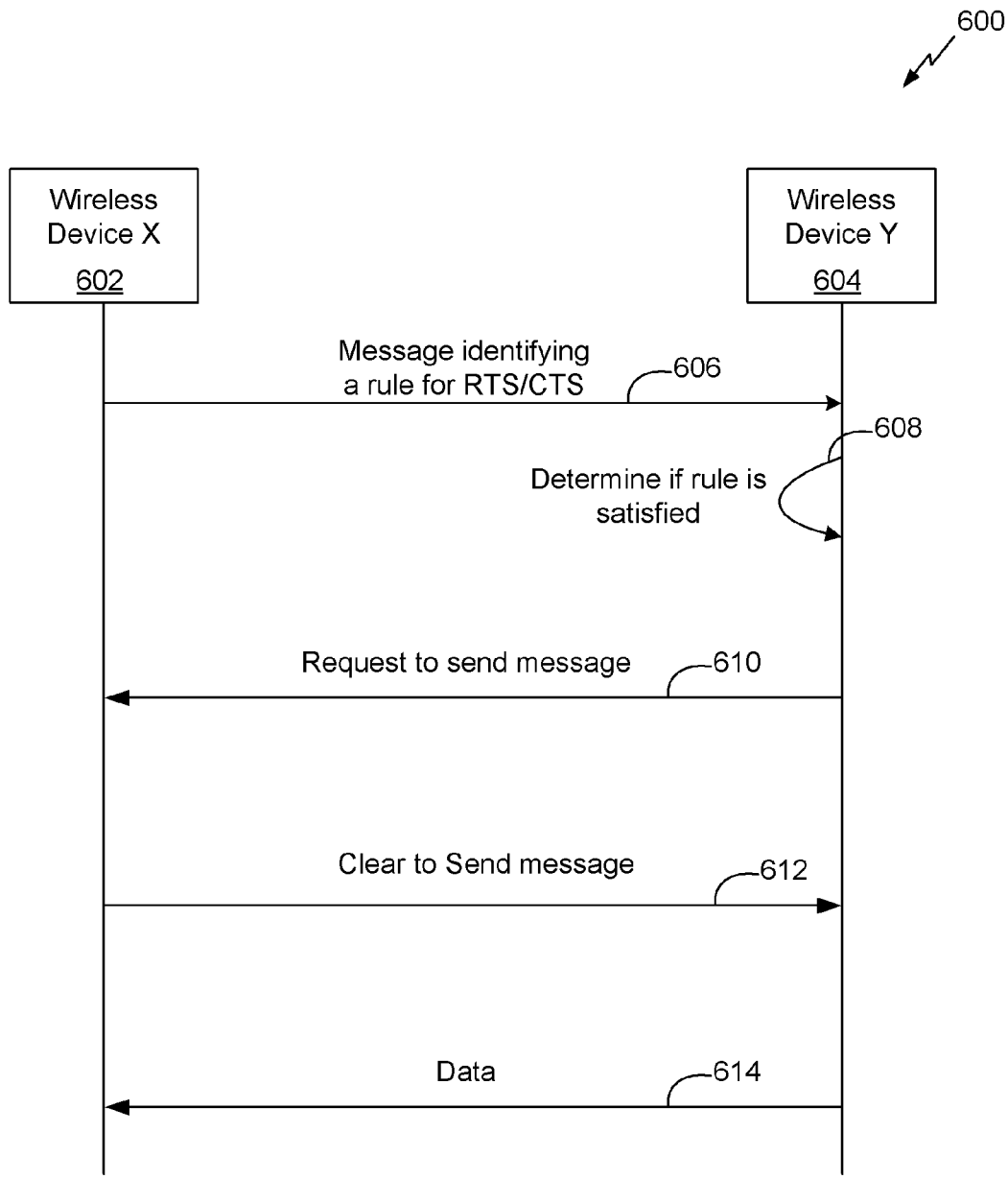
FIG. 5 is a call flow diagram illustrating a process for transmitting data in accordance with an embodiment.

FIG. 5 depicts a call flow diagram generally designated 600. In call flow 600, wireless device X 602 may be an AP, substantially similar to AP 104, 250, or 502, or alternatively may be a STA 106, 260, or 552 as previously described herein. Similarly, wireless device Y 604 may also be implemented as either an AP 104 or STA 106 as described above, in FIG. 1A or FIG. 1b, for example. As such, in certain embodiments, the identification of a rule governing the use of RTS/CTS, and hence the control of the implementation of the RTS/CTS protocol for high efficiency wireless, can be controlled by either the AP 104 or the STA 106. Accordingly, in certain embodiments the same RTS/CTS protocols may be implemented in a peer-to-peer (STA-to-STA) wireless communication scheme.

The call flow 600 may begin with a message 606 sent from wireless device X 602 to wireless device Y 604 indicating a rule governing the implementation of the RTS/CTS protocol. As discussed above, the rule may identify a condition or conditions that determine the enablement of RTS/CTS protocol. Conditions may be based on one of a variety of characteristics as noted above, or other applicable wireless link conditions. Rules may be identified noting a required reference value or threshold. Node Y 604 may receive message 606 and identify the portion of the information indicating the conditions upon which Node Y 604 must use RTS/CTS to transmit data to Node X 602. Node Y 604 then may determine 608 whether the condition is met. If the condition or conditions indicated in the rule are met, then Node Y 604 may send its next traffic, a data message 614, following a request to send message 610 to Node X 602 and a clear to send message 612 when the channel or medium is clear.

Figure 6:
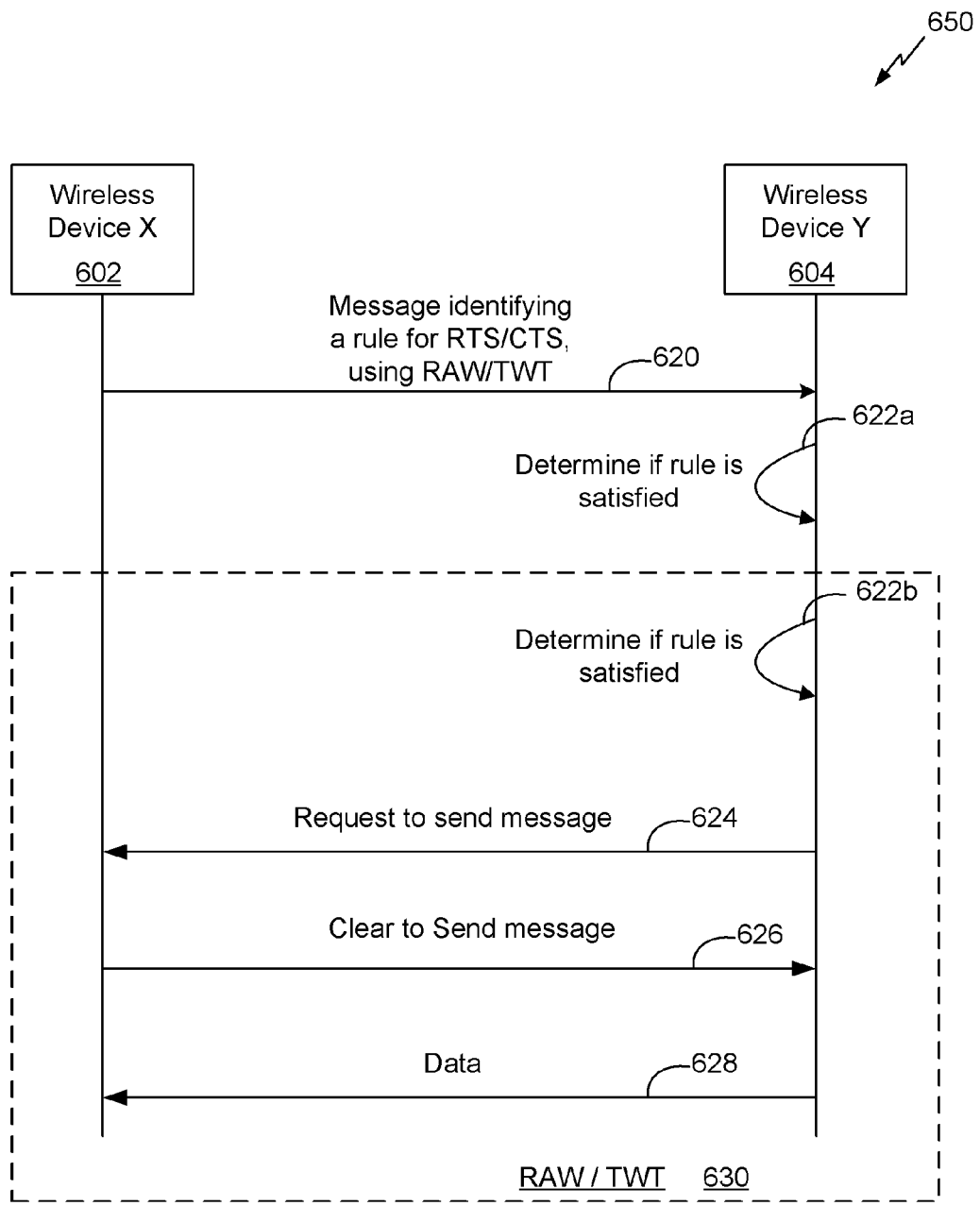
FIG. 6 is another call flow diagram illustrating a process for transmitting data in accordance with an embodiment.

Referring to FIG. 6, another call flow diagram 650 is depicted. Call flow 650 is similar to call flow 600, comprising communications between the Node X 602 and the Node Y 604. In call flow 650 however, in addition to the rule and condition(s) governing the implementation of a RTS/CTS protocol, the message 620 from wireless device X 602 also includes a temporal condition. Such a temporal condition may include a restriction in which the use of RTS/CTS is at least in part based on a specific timeframe. In an embodiment, a restricted access window (RAW) or a target wake time (TWT) may be utilized to affect such a time-based condition. A temporal condition, such as a RAW or a TWT, may limit the time that a wireless device is "awake" or able to receive traffic in some wireless environments. In the call flow 650, a RAW or TWT may be a condition upon which the RTS/CTS protocol is employed on the wireless link. In some embodiments, such a temporal restriction may be used in concert with one or more of the conditions as previously discussed. A RAW definition or rule may indicate whether data transmission within the RAW or during the TWT interval is to be preceded by an RTS/CTS message. As above, each of the rules may be promulgated in a beacon or other transmission, indicating when and for how long the RTS/CTS protocols are to be implemented. Generally, the more conditions included in a given rule, the more restrictive the use of the RTS/CTS protocol becomes.

Call flow 650 begins with a wireless device X 602 transmitting a message 620 indicating a rule for the implementation of a RTS/CTS protocol for the wireless link. As discussed above, the rule included in the message 620 may be based on a given condition of the wireless link or environment, in addition to a RAW/TWT 630 (indicated with dashed lines). When wireless device Y 604 has traffic to send, it must first determine if the conditions satisfy the rule indicated in the message 620. The wireless device Y 604 determines 622a that the conditions are not satisfied because the RAW/TWT 630 is not open. The wireless device Y 604 may continue to periodically check whether the rule is satisfied. Then the wireless device Y 604 may determine 622b that the RAW/TWT 630 is open, and wireless device Y 604 may send an RTS message 624 to the wireless device X 602. The wireless device X 602 may then respond with a CTS message 626 if the medium is clear and the wireless device X 602 is ready to and capable of receiving traffic. The call flow 650 may then proceed to a data transmission with a message 628 wherein wireless device Y 604 transmits its traffic to wireless device X 602.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal or a channel). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of wireless communication, comprising: selectively enabling a request to send/clear to send protocol between an access point and a first device based on whether each transmission characteristic of a first rule satisfies a first link characteristic threshold, wherein the first rule includes one or more communication link characteristics for enabling usage of the request to send/clear to send protocol between the access point and the first device and the first rule enables the request to send/clear to send protocol between the access point and the first device when a modulation and coding scheme of the first device exceeds a threshold; and selectively enabling the request to send/clear to send protocol for communication between the access point and a second device based on whether each link characteristic of a second rule satisfies a second link characteristic threshold, wherein the second rule includes one or more communication link characteristics for enabling usage of the request to send/clear to send protocol between the access point and the first device.

2. The method of claim 1, further comprising communicating the first rule and the second rule to the respective first device and second device.

3. The method of claim 2, wherein the communication of the first rule and the second rule is through communication of at least a management frame.

4. The method of claim 2, wherein the communication of the first rule and the second rule is through communication of at least a unicast message.

5. The method of claim 2, wherein the communication of the first rule and the second rule is through communication of at least a broadcast message to the plurality of devices.

6. The method of claim 2, wherein the communicating includes communication of a binary indicator for enabling or disabling the usage of at least one of the first rule and the second rule.

7. The method of claim 2, wherein the communicating includes communication of a time period indicator for usage of at least one of the first rule and the second rule.

8. The method of claim 1 further comprising receiving a request to send message from at least one of the first device and the second device based respectively on the first rule and the second rule, wherein communication link characteristics of the first rule and the second rule are different.

9. The method of claim 1, wherein the second rule enables the request to send/clear to send protocol when the request to send/clear to send protocol is disabled and the second device is transmitting beamformed transmissions.

10. An apparatus for wireless communications comprising: a memory configured to store data relating to communication link characteristics; and an electronic hardware processor configured to selectively enable a request to send/clear to send protocol for communication between an access point and a first device based on whether each transmission characteristic of a first rule satisfies a first link characteristic threshold, wherein the first rule includes one or more communication link characteristics for enabling usage of the request to send/clear to send protocol between the access point and the first device and the first rule enables the request to send/clear to send protocol between the access point and the first device when a modulation and coding scheme of the first device exceeds a threshold; and selectively enable the request to send/clear to send protocol for communication between the access point and a second device based on whether each link characteristic of a second rule satisfies a second link characteristic threshold, wherein the second rule includes one or more communication link characteristics for enabling usage of the request to send/clear to send protocol between the access point and the first device.

11. The apparatus of claim 10 further comprising a transmitter configured to communicate the first rule and the second rule to the respective first device and second device.

12. The apparatus of claim 11, wherein the transmitter is further configured to communicate at least one of the first rule and the second rule via at least a management frame.

13. The apparatus of claim 11 wherein the transmitter is further configured to communicate at least one of the first rule and the second rule via at least a unicast message.

14. The apparatus of claim 11 wherein the transmitter is further configured to communicate at least one of the first rule and the second rule via at least a broadcast message to the plurality of devices.

15. The apparatus of claim 11, wherein the transmitter is further configured to communicate a binary indicator for enabling or disabling the usage of at least one of the first rule and the second rule.

16. The apparatus of claim 11, wherein the transmitter is further configured to communicate a time period indicator for usage of at least one of the first rule and the second rule.

17. The apparatus of claim 10 further comprising a receiver configured to receive a request to send message from at least one of the first device and the second device based respectively on the first rule and the second rule, wherein the communication link characteristics of the first rule and the second rule are different.

18. The apparatus of claim 10, wherein the first rule and the second rule comprise a packet error rate is greater than a packet error rate threshold.

19. The apparatus of claim 10, wherein the second rule enables the request to send/clear to send protocol when the request to send/clear to send protocol is disabled and the second device is transmitting beamformed transmissions.

20. An apparatus for wireless communication, comprising: means for selectively enabling a request to send/clear to send protocol between an access point and a first device based on whether each transmission characteristic of a first rule satisfies a first link characteristic threshold, wherein the first rule includes one or more communication link characteristics for enabling usage of the request to send/clear to send protocol between the access point and the first device and the first rule enables the request to send/clear to send protocol between the access point and the first device when a modulation and coding scheme of the first device exceeds a threshold; and means for selectively enabling the request to send/clear to send protocol between the access point and a second device based on whether each link characteristic of a second rule satisfies a second link characteristic threshold, wherein the second rule includes one or more communication link characteristics for enabling usage of the request to send/clear to send protocol between the access point and the first device.

21. The apparatus of claim 20, wherein the means for selectively enabling and the means for identifying comprise a processor.

22. The apparatus of claim 20 further comprising means for communicating the first rule and the second rule to the respective first device and second device.

23. The apparatus of claim 22, wherein the communicating means is configured to communicate the first rule and the second rule is via at least a management frame.

24. The apparatus of claim 22, wherein the communicating means is configured to communicate the first rule and the second rule is via at least a unicast message.

25. The apparatus of claim 22, wherein the communicating means is configured to communicate the first rule and the second rule is via at least a broadcast message to the plurality of devices.

26. The apparatus of claim 22, wherein the communicating means is configured to include a binary indicator for enabling or disabling the usage of at least one of the first rule and the second rule.

27. The apparatus of claim 22, wherein the communicating means is configured to include a time period indicator for usage of at least one of the first rule and the second rule.

28. The apparatus of claim 20 further comprising means for receiving a request to send message from at least one of the first device and the second device based respectively on the first rule and the second rule, wherein the communication link characteristics of the first rule and the second rule are different.

29. The apparatus of claim 20, wherein the first rule comprises: an access class of the first device is in an access class set indicated by the first rule.

30. A non-transitory computer readable medium containing instructions that when executed, cause a computer to: selectively enable a request to send/clear to send protocol between an access point and a first device based on whether each transmission characteristic of a first rule satisfies a first link characteristic threshold, wherein the first rule includes one or more communication link characteristics for enabling usage of the request to send/clear to send protocol between the access point and the first device and the first rule enables the request to send/clear to send protocol between the access point and the first device when a modulation and coding scheme of the first device exceeds a threshold; and selectively enable the request to send/clear to send protocol between the access point and a second device based on whether each link characteristic of a second rule satisfies a second link characteristic threshold, wherein the second rule includes one or more communication link characteristics for enabling usage of the request to send/clear to send protocol between the access point and the first device.

31. The non-transitory computer readable medium of claim 30 further configured to cause a computer to communicate the first rule and the second rule to the respective first device and second device.

32. The non-transitory computer readable medium of claim 31 further configured to cause a computer to communicate the first rule and the second rule is via at least a management frame.

33. The non-transitory computer readable medium of claim 31 further configured to cause a computer to communicate the first rule and the second rule is via at least a unicast message.

34. The non-transitory computer readable medium of claim 31 further configured to cause a computer to communicate the first rule and the second rule is via at least a broadcast message to the plurality of devices.

35. The non-transitory computer readable medium of claim 31 further configured to cause a computer to include a binary indicator for enabling or disabling the usage of at least one of the first rule and the second rule.

36. The non-transitory computer readable medium of claim 31 further configured to cause a computer to include a time period indicator for usage of at least one of the first rule and the second rule.

37. The non-transitory computer readable medium of claim 30 further configured to cause a computer to receive a request to send message from at least one of the first device and the second device based respectively on the first rule and the second rule, wherein the communication link characteristics of the first rule and the second rule are different.

38. The non-transitory computer readable medium of claim 30, wherein the second rule enables the request to send/clear to send protocol when the request to send/clear to send protocol is disabled and the second device is transmitting beamformed transmissions.

\* \* \* \* \*